(12) United States Patent
Miles (10) Patent No.: US 8,346,612 B2
(45) Date of Patent: Jan. 1, 2013

(54) BUSINESS MODELS FOR IMMERSIVE ENVIRONMENTS

(76) Inventor: Mark W Miles, San Francisco, CA (US)

( * ) Notice: Subject to any disclaimer, the term of this patent is extended or adjusted under 35 U.S.C. 154(b) by 0 days.

(21) Appl. No.: 11/394,534

(22) Filed: Mar. 30, 2006

(65) Prior Publication Data

US 2007/0239558 A1 Oct. 11, 2007

(51) Int. Cl.
*G06Q 30/00* (2006.01)
(52) U.S. Cl. ...................... 705/26.1; 705/27.1
(58) Field of Classification Search ............ 705/26, 705/27

See application file for complete search history.

(56) References Cited

U.S. PATENT DOCUMENTS

| | | | |
|---|---|---|---|
| 6,956,543 B2 * | 10/2005 | Sato et al. ........................ 345/9 |
| 2001/0053996 A1 * | 12/2001 | Atkinson ........................ 705/14 |
| 2003/0151562 A1 * | 8/2003 | Kulas ............................. 345/1.1 |
| 2004/0125044 A1 * | 7/2004 | Suzuki ........................... 345/1.1 |
| 2006/0059045 A1 * | 3/2006 | Babbar et al. .................. 705/14 |
| 2007/0000185 A1 * | 1/2007 | DeLine ............................. 52/33 |

OTHER PUBLICATIONS

Walters, Brian: "Who's Who in Training & Simulation," Armada International, v25n2p51; Apr. 2001; Dialog file 16 #08621041, 39pgs.*

* cited by examiner

*Primary Examiner* — Robert M. Pond
(74) *Attorney, Agent, or Firm* — Hahn Moodley LLP; Vani Moodley, Esq.

(57) ABSTRACT

In one embodiment, the invention provides a method for a viewspace provider. The method comprises providing a viewspace at a location; and engaging in a transaction with an entity for a monetary amount associated with the provision of the viewspace.

17 Claims, 12 Drawing Sheets

BUSINESS MODELS FOR IMMERSIVE ENVIRONMENTS

FIELD OF THE INVENTION

Embodiments of this invention relate to the application and utilization of immersive environments for business purposes.

Train stations. Fixed/defined freely accessible public spaces.

BACKGROUND

Immersive environments, as described in patent application Ser. No. 11/136,111 filed on May 24, 2005 and herein incorporated by reference, comprise an array of video or image displays (i.e. Liquid Crystal Displays (LCDs), plasma displays, projection displays, etc.), video or image data generation hardware, and customized video or image content. The latter is generated using a combination of computer software (CG or computer graphics) and/or specialized image capture hardware. The resulting system, a Viewspace, is a tool for creating a reprogrammable visual and audio environment, that is outside or inside of or coupled to a defined physical space. A viewer resident within the environment gets the sense that the space is being extended physically, and enhanced or altered visually.

A multiplicity of environments can be created which may range from completely abstract constructs, animated scenes and sequences, or photo realistic representations of a vista or location. The appeal of such an environment or space is determined in part by the programming presented on the Viewspace, the nature of the physical space in which it is integrated, and the purpose of the physical space. The kind of application or business model which might be supported by the Viewspace is also influenced by these factors.

A museum or publicly accessible installation (for example a train station or an assembly area associated with a stadium or some other public attraction) would be an example of a minimalist space, with few accoutrements or interior/exterior embellishments. Such a simple room would serve to place the attention and emphasis only on the Viewspace. Thus the purpose of the Viewspace and/or the physical environment or context are geared to focus a patron's attention on the programming of the Viewspace. Conversely, the function is to focus the patron or passerby's attention away from the existing physical environment.

More private or commercially oriented venues tend to serve a different overarching function resulting in different interior or exterior designs. Examples range from commercial venues such as restaurants, bars, lounges, and retail stores, to private venues such as individual homes and personal spaces (individual rooms). This drives both a different means for integrating the Viewspace (its physical orientation and incorporation into the interior space) as well as the nature of the programming. The design and programming of the Viewspace is accomplished by a team of artists (visual, video, CG, etc.), engineers, systems integrators, programmers, and interior designers who can be collectively referred to as a Viewspace provider.

Advertising is a pervasive activity in modern society as providers of a multitude of products and services strive to bring public attention to their offerings. Mediums for advertising are constantly evolving. Consequently there is a continuing pressure to produce more advertisements within a particular medium, or find new mediums and mechanisms to achieve greater effect.

One relatively recent trend in advertising is that of product placement. Specifically this refers to taking some dynamic visual content, a movie for example, which as its base function provides a source of entertainment. Product placement seeks to achieve exposure of the product or service by having it featured within the movie. An automobile, or perhaps a mobile phone. The movie itself, does not directly describe or detail the attributes of the product. However the way in which the product is featured and/or its association with the movie, its characters, or other properties of the base content can enhance the product's appeal to the viewing public. This model has the potential to be replicated with other newer mediums with inherent value.

SUMMARY OF THE INVENTION

According to a first aspect of the invention there is provided a business model for the monetization of a Viewspace which involves transactions between a patron or a customer of a Viewspace and the Viewspace Provider According to a second aspect of the invention there is provided a business model for the monetization of a Viewspace that relies on transactions between the owner or controlling party of a Viewspace, and the Viewspace Provider.

According to a third aspect of the invention there is provided a business model for the monetization of a Viewspace which relies on transactions between patrons and customers of a location or venue in which a Viewspace resides, and the Viewspace Provider.

According to a fourth aspect of the invention there is provided a business model for the monetization of a Viewspace which relies on transactions between the owner or controlling party of a physical location or venue, in which a Viewspace resides, and the Viewspace Provider.

According to a fifth aspect of the invention there is provided a business model for the monetization of a Viewspace that depends on transactions which occur between an entity which generates, manages, or distributes base content for a Viewspace and the Viewspace Provider.

According to a sixth aspect of the invention there is provided a business model for the monetization of a Viewspace that relies on transactions which occur between a entity which generates, manages, or distributes supplemental content for a Viewspace, and the Viewspace Provider.

According to a seventh aspect of the invention there is provided a business model which incorporates elements of one or more of the aforementioned business models.

Other aspects of the invention will be apparent from the detailed description below:

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
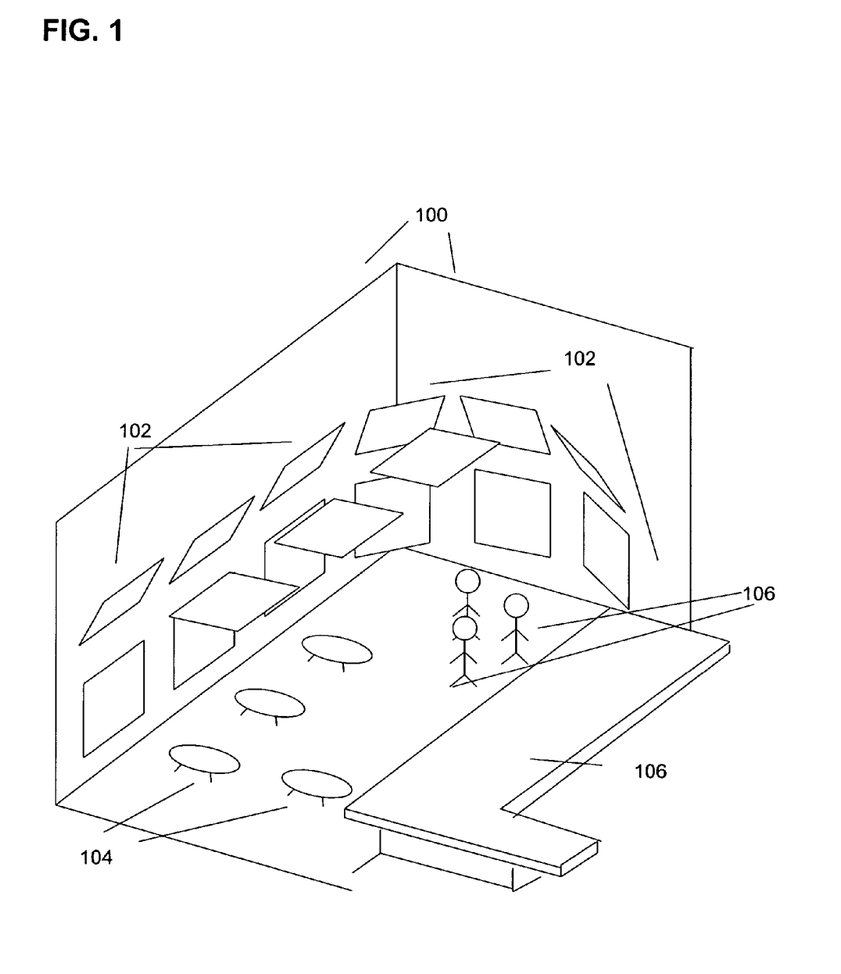
FIG. 1 of the drawings is an illustration of a Viewspace.

Referring now to FIG. 1, a viewspace 100 is illustrated. Broadly, a viewspace is a location in the real world that is visually or visually and audibly augmented by the presence of multiple windows, 102, such as electronic flat panel displays, projection displays, etc., which can portray imagery or visual content. In this case, the Viewspace is located within a bar containing, tables, 104, a serving area, 106, and patrons, 108. The visual augmentation can be realized in the form of imagery that is synthesized or captured, abstract or real, still or dynamic, or some combination thereof. Fundamentally, however, the nature of the content provides a means to increase the value of a particular location. Increasing the value can be interpreted as making the space more attractive to individuals, customers, patrons, or passerby. As a consequence there is an innate desire to spend time within the Viewspace that is in addition to coupled with any incentives which may be inherent to the space as it initially exists. The Viewspace may be configured to provide a collective perspective on an immersive environment (IE). It is collective in the sense that patrons of the lounge may all experience the IE at the same time, but with the benefits of various window and viewset configurations as will be described later. One example, illustrated in FIG. 1, could be a bar or lounge which has inherent attractions that draw patrons or customers. The incorporation of a Viewspace can increase this appeal by making it possible to reprogram, or dynamically control the interior appearance and ambience of the establishment.

The viewspace may be inside a building, or outside depending on the capabilities of the display devices. The configuration of the windows may be arbitrary depending on the setting and the nature of the content. The nature of the content is also arbitrary, but limited by the capabilities of the underlying hardware. Content is defined as a visual or audio/visual program that can vary in appearance over time. The content may be in the form of a pre-generated sequence, a sequence that is generated in real-time, or some combination of the above.

The viewspace may include a plurality of display screens positioned at different positions within a real space. Each display screen may be associated with a different window into an object space through which a scene comprising objects from the object space can be seen. Scenes from the object space may be displayed on each of the plurality of display screens such that the scene displayed on each screen comprises objects from the object space that can be seen through the window associated with that screen by a hypothetical viewer positioned at a first position relative to the window and for which window the field of view is restricted to be non-overlapping with the field of view for an adjacent window.

The Viewspace Provider has as one of its roles the generation of content for the Viewspace. Performing this function requires a team of skilled individuals working together from a variety of disciplines. At the core resides a team of visual artists who are able to take a concept and reduce it to a scene or a series of scenes which will act as a guide for a particular Viewspace program. This same group, supplemented with individuals who have skills in CG and filmmaking disciplines, then creates a fully detailed visual sequence that is three-dimensional, i.e. comprising elements which are represented or modeled in three dimensions. The sequence is subsequently rendered into an array of sequences which correspond to the different perspectives or windows within the Viewspace. Alternatively, a collection of two-dimensional images, which may be synthesized or captured, may serve as the basis for the sequence, sometimes in conjunction with three dimensional content. This core team is managed and directed by individuals whose role is to extract ideas and visions from clients, customers, advertisers, and others who have a desire to generate content specifically for Viewspace medium.

The hardware and software system which comprises the Viewspace is also created by a Viewspace Provider, using the requisite set of skilled professionals resources, and facilities in its employ or under contract who can develop, design, install, and maintain the hardware and software systems required for the Viewspace facility. Additionally there are potentially very large amounts of data required for the Viewspace content. Consequently, the Viewspace Provider may also be responsible for the installation and maintenance of facilities, networks, and software utilities that allow for the management, storage, and distribution of Viewspace content.

Content management and scheduling is a service which a Viewspace Provider may also support. Via the aforementioned network, it is not only possible to digitally distribute content (though various digital media such as magnetic tape, Optical disc, and portable hard disks are also possible,) but it is possible to schedule the playback of the content. In one embodiment, the digital media may be used to store content which is generated by computer graphics (CG) and rendering facility. This content is usually developed by artists or animators who are skilled in the art of creating purely immersive imagery and/or imagery which combines the immersive with the real. For example there is a lot of immersive imagery which is incorporated into much of the visual media that is watched. In one embodiment, the digital media may include a plurality of video streams that together define immersive content, wherein each video stream captures an object space through the eyes of a hypothetical viewer looking into the object space through a notional window associated with the video stream, and wherein the windows associated with the video streams are spatially offset. In another embodiment, the hardware which resides onsite at the particular venue or location may be controlled via this network. Thus, should a client or venue owner wish, it is possible for the Viewspace provider to distribute content to the specific locale, but also to determine what schedule, frequency, and versions of the content are to be viewed.

As a business entity, the Viewspace Provider's purpose is to generate profit in some fashion by enabling the added value that a Viewspace brings to a venue or location. This value generation occurs by virtue of exploiting some or all of the aforementioned services and capabilities of the Viewspace Provider. Some or all of these services may be be provided under the direction or guidance of an entity desiring to posses, use, or exploit a Viewspace.

Figure 2:
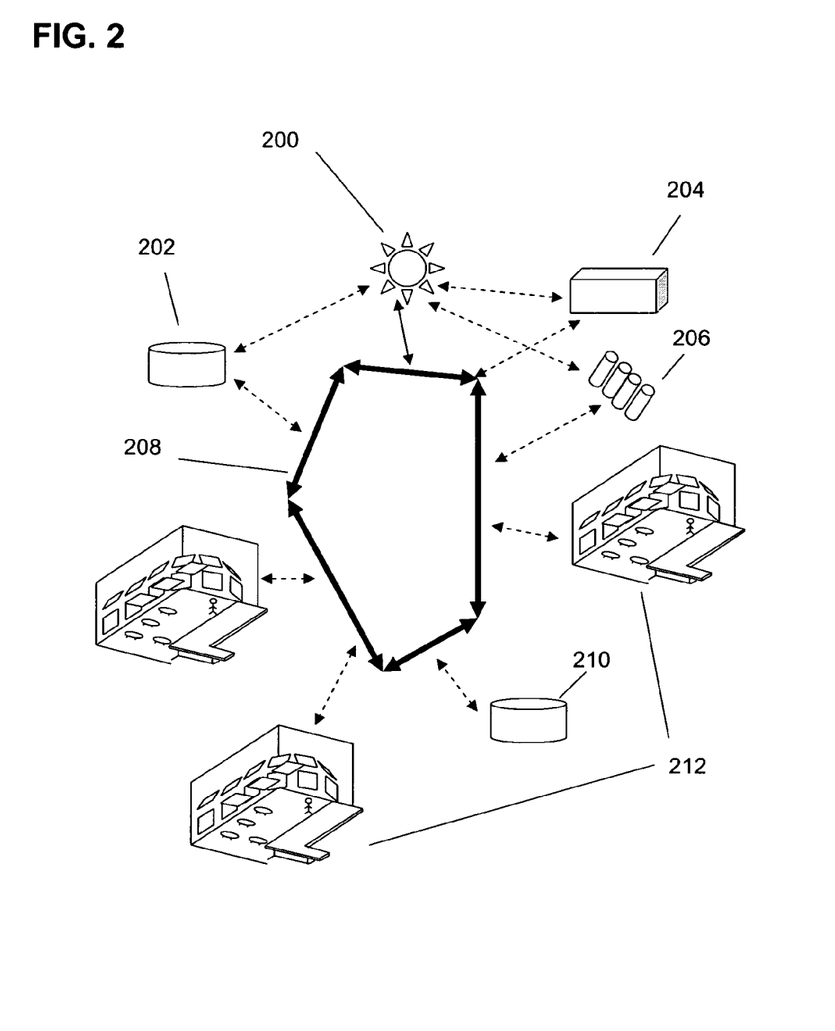
FIG. 2 of the drawings is an illustration of a system for Viewspace content generation, management, and distribution.

Referring now to FIG. 2, a diagram is shown which illustrates a system for the generation, management, and distribution of Viewspace content. Viewspace provider, 200, incorporates the tools, resources and professionals as described above for the services involving both the Viewpsace and Viewspace content. Facilities could include external content storage facilities, 202 and 208, and external rendering facility, 204. Storage facilities, 202 and 210, comprise an array of read/write storage devices such as hard drives, optical drives, or other high capacity storage media. These may occur in the form of mirror sites (i.e. locations all containing the same data) located in strategically important places to facilitate access to the stored data by both the Viewspace provider, 200, and a network 206. External rendering facility, 204, is a collection of microprocessor or computing hardware arrays whose primary function is to utilize hardware and software algorithms to render computer generated images. This facility may be a sole or supplementary facility that is in some fashion managed directly or indirectly by the Viewspace Provider and potentially connected to network 208. Facilities could also include image input array 206, which is a specially designed camera array which can be used to capture live content to be specifically formatted for use in a Viewspace. Network 208 is a readily accessible data transmission network which allows for the transmission of large amounts of data between the Viewspace provider, 200, storage and rendering facilities, 202, 208, and 204, input array 206, as well as Viewspaces 210. The internet is one example of such a network. Cell phone wireless, or dedicated wire or wireless networks may also provide such a resource.

Figure 3:
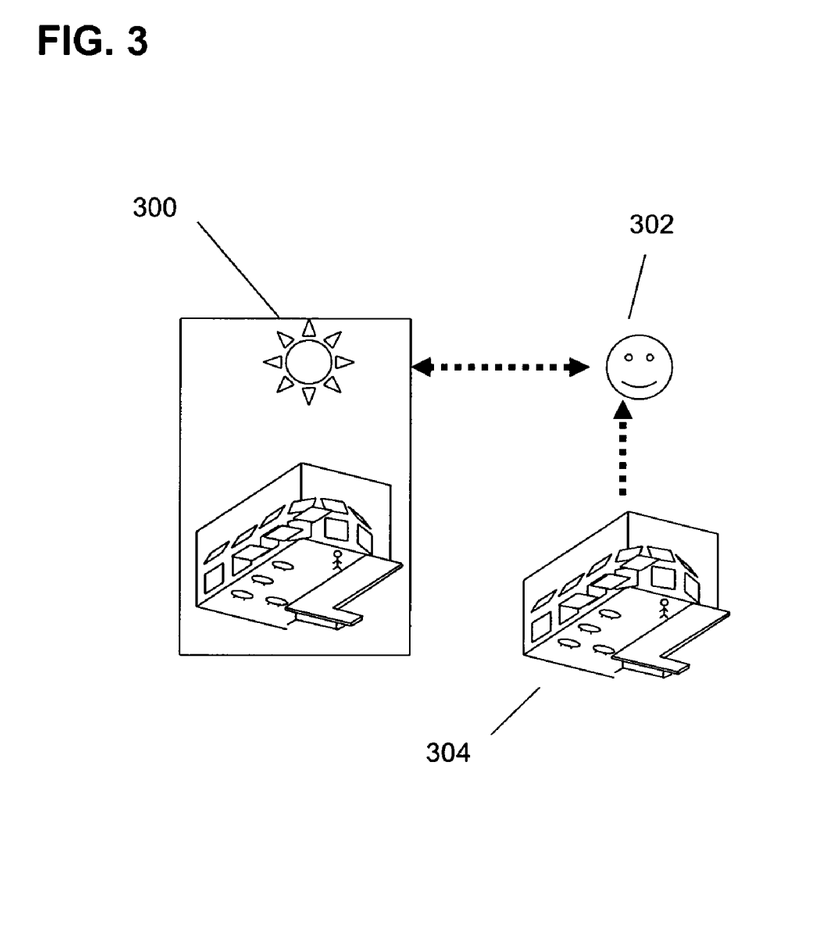
FIG. 3 of the drawings diagrams a business relationship between a Viewspace Provider and a Viewspace customer or patron.

Referring now to FIG. 3, a diagram is shown which illustrates one business model by which Viewspace Provider may generate profit and function successfully as a business. In this particular scenario, the Viewspace Provider owns or otherwise exercises control over a particular space or venue, 300, in which the Viewspace is installed. Patrons or customers, 302, are drawn in whole or in part to spend time within this venue because of the appeal that the Viewspace provides. Consequently there is an opportunity for the Viewspace Provider to charge a fee for access to the Viewspace. Alternatively, the Viewspace Provider may not own the venue or the Viewspace, but by virtue of owning controlling Intellectual Property over the concept of the Viewspace and or Viewspace Content, is able to charge a customer or patron directly for enjoying the benefits of this IP.

Figure 4:
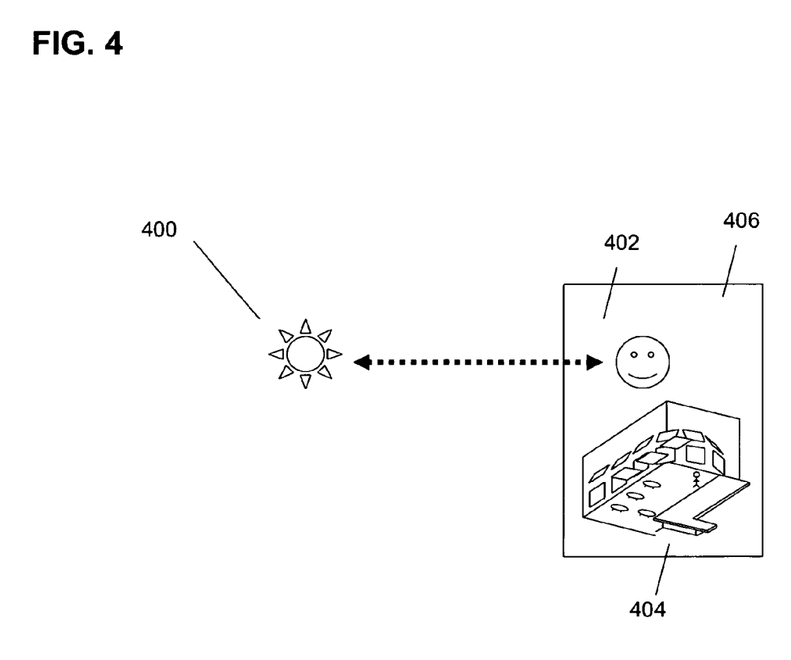
FIG. 4 of the drawings diagrams a business relationship between a Viewspace Provider and the owner or controlling entity of a Viewspace FIG. 5 of the drawings diagrams a relationship between a Viewspace Provider and a customer or patron of a venue or location wherein which resides a Viewspace.

Referring now to FIG. 4, Viewspace Provider, 402, is shown engaged in transactions with the owner, 402, of a Viewspace, 404, which resides in venue or location, 406. The owner, for example, may have an agreement with a chain of convenience stores wherein the owner manages the Viewspaces for these locations. The value of the venue is enhanced by the presence and operation of the Viewspace, therefore the owner is able to charge extract some revenue from the chain, provider is able to charge a fee to the owner. The fee could occur in a variety of forms including Viewspace installation fees, licensing fees, and maintenance fees. Charges may also be levied on content for the Viewspace. Using the facility described in FIG. 2, the Provider may collect fees for the generation of the content, and/or its distribution to the Viewspace or Viewspaces if there are multiple sites. Fees for the storage and management of the Viewspace content data may also be levied.

Figure 5:
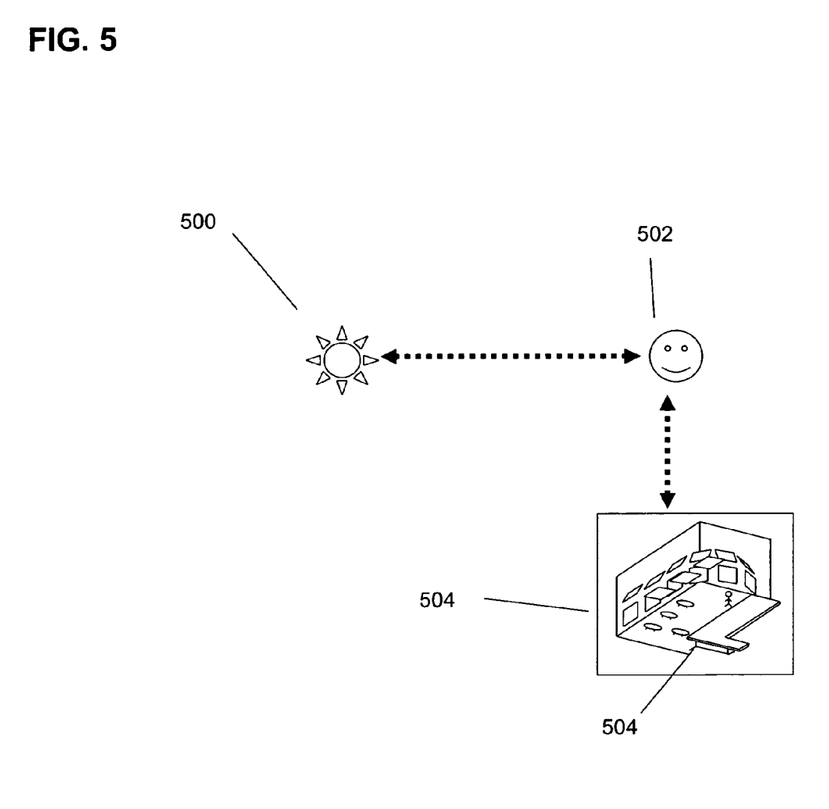

Referring now to FIG. 5, transactions are illustrated which occur between the Viewspace Provider, 500, and a customer who is patronizing a venue or location, 504, in which a Viewspace, 506, resides. Such venues include, but are not limited to, bars, restaurants, retail store and malls. In all cases, the customer would normally patronize the venue for reasons that pertain to the core function of the venue. Because the incorporation of the Viewspace enhances the appeal or somehow increases the effectiveness of the venue, the provider is able to charge a fee directly to the customer. For example, if the customer selects particular programming for the Viewspace, then the provider may charge a fee directly to the customer bypassing the owner of the venue, based on the nature of the content.

Figure 6:
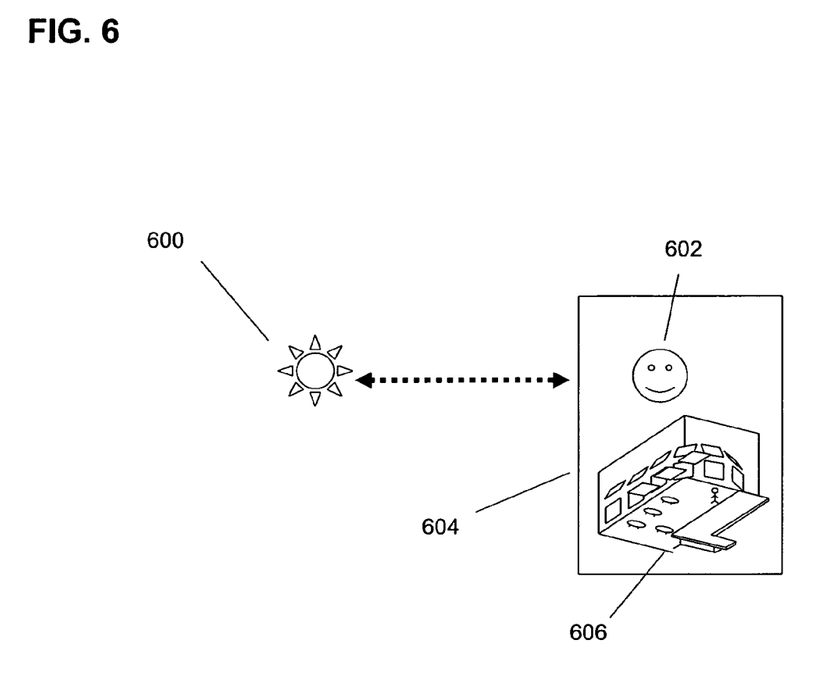
FIG. 6 of the drawings diagrams a business relationship between a Viewspace Provider and an the owner or controlling party of a venue or location wherein which resides a Viewspace.

Referring to FIG. 6, transactions are shown occurring between the Viewspace Provider and an entity, 604, which owns, controls, or operates a venue in which a Viewspace, 606, resides. Again, because the Viewspace brings added value and appeal to the venue, the Viewspace Provider is able to levy fees in a variety of ways on the Viewspace facility, and the Viewspace content. The owner may charge a premium to her customers for the opportunity to experience the Viewspace. The Provider may derive income from some share of the overall profits of the venue, from an upfront fee charged by the owner, or via a schedule of fees of the sort mentioned earlier in this application. Additional fees as described in prior examples may also be applied.

Figure 7:
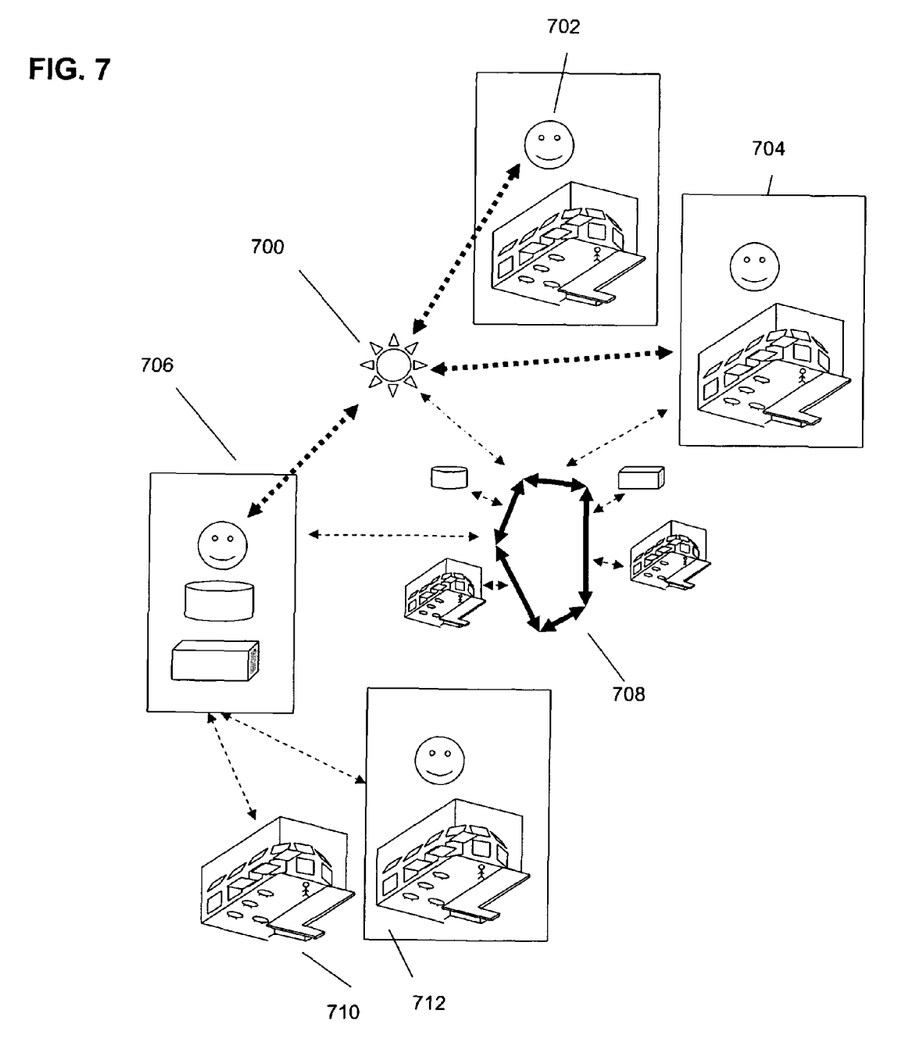
FIG. 7 of the drawings diagrams a business relationship between a Viewspace Provider and an entity which generates, manages, or distributes base content for a Viewspace.

Referring now to FIG. 7, a business model centered around base content is illustrated. Base content is defined as a Viewspace program which serves only to enhance or accentuate the venue in which the Viewspace resides. The program or programs run for some fraction of the operational period of the Viewspace. Viewspace provider, 700, is shown engaged in transactions with venue owner, 704, or Viewspace owner 702, as well as alternative Viewspace Provider, 706. Services provided to the owners 704 and 702 involve the generation, distribution, and management of content for a Viewspace. The content can be generated by the Provider and possibly distributed via network 708, which may or may not be under the control of the Viewspace provider. Owners 702 and 704 make requests for, or participate in the development of content which is specific to their Viewspace, or network of Viewspaces. They may also select from a catalog of existing programs and/or have existing programs customized to their needs. Alternative Viewspace Provider, 706, has an agreement with Viewspace Provider, 700, to supply the full range or a subset of services and functions that Provider 700 does This could include content generation functions which take a sketched vision and generate digital data streams. Such an arrangement might be preferred by a client or customer because of prior existing relationships. In this case the alternative provider receives a license based on some agreed upon terms, and the requisite information to produce content for one or more Viewspaces. In this case the content is created for captive Viewspaces, 710 and 712, also owned by the alternative Provider, or for Viewspaces located on network 708 which operate under different ownership. Provider 700 collects fees from alternative Provider 706.

An alternative provider might also be an entity which specializes in the integration and maintenance of the Viewspace hardware. The video driver hardware, display hardware, networking interfaces, and mechanical and electrical infrastructure will have to be sourced, assembled, installed, and periodically calibrated and inspected. All these functions could be outsourced or contracted under agreed upon terms.

Figure 8:
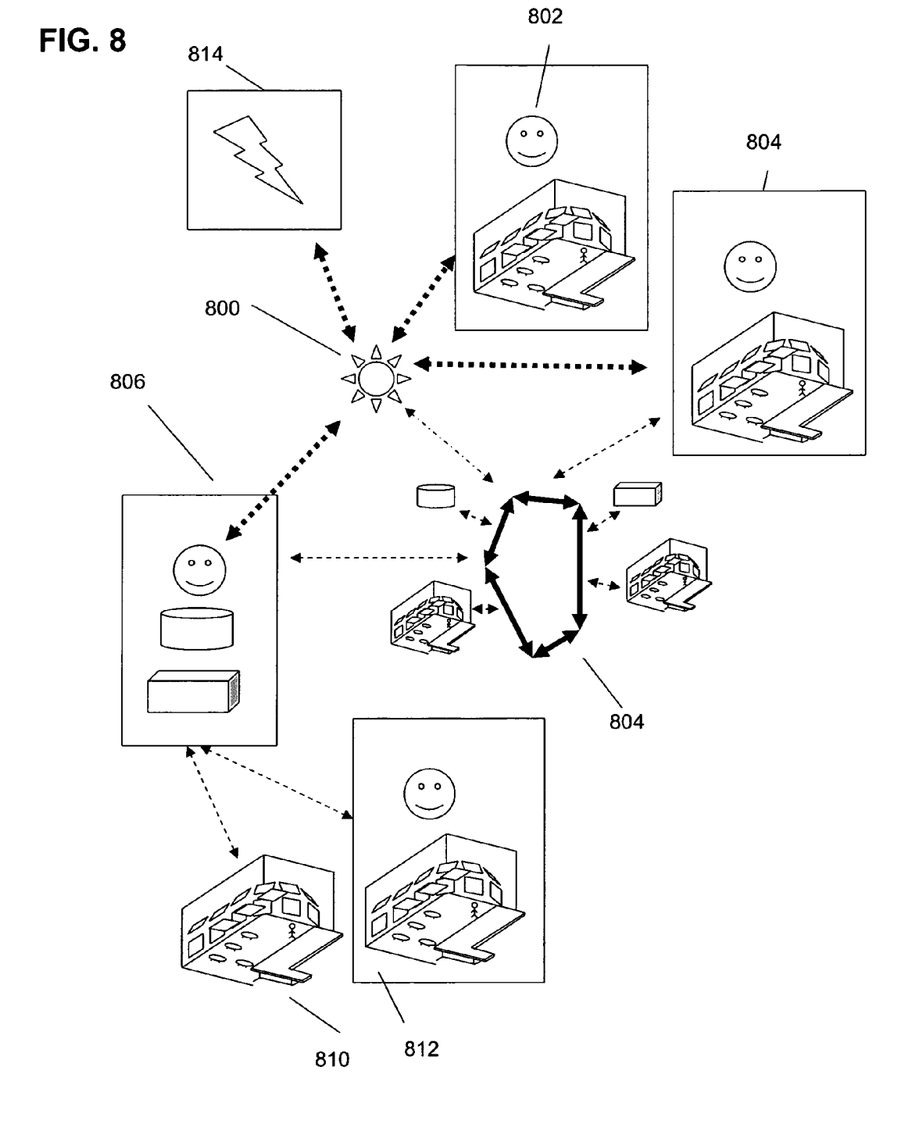
FIG. 8 of the drawings diagrams a business relationship between a Viewspace Provider and an entity which generates, manages, or distributes supplemental content for a Viewspace.

Referring now to FIG. 8, a business model similar to that of FIG. 7 is illustrated. In this case the model centers around supplementary content and placement. Supplementary content is programming for a Viewspace whose purpose serves as an advertisement. In such a program products or services are advertised by incorporation into the supplementary program. This could occur in a variety of ways ranging from direct placement of images of products into the imagery, to indirect or abstract references to the product of service. The supplemental programs may be interlaced with base programming for some fractional amount of time. For example during the operational period of a Viewspace coinciding with the service hours of an establishment, 2:00 pm to 2:00 am for example, 10% or 1.2 hours of the programming might be devoted to supplemental programming while the balance is dedicated to base programming. Interlacing refers to how the advertising is distributed within the operational period. One extreme represents a single 1.2 hour time slot devoted entirely to the supplemental content, while another extreme is given by the uniform distribution of the 1.2 supplemental content throughout the operational period. The length of the supplemental program may be quite short, perhaps a on the order of seconds or less, or might be as rich and long as any of the base programs presented. A product may be visually inserted into programming quite easily using the relevant CG programs or digital media software (MAYA and Adobe Premiere, are two examples). For interlacing of supplemental content in to base content, the specific balance of the two is arbitrary and determined by the owners and advertising professionals involved.

In addition to fees charged to venue and Viewspace owners 804 and 802, and those charged to alternative Provider, 806, fees may also be charged to advertiser or advertising agency, 814. An advertiser is an entity which provides a particular product or service, while an advertising agency works on behalf of the advertiser to create the supplemental program. The fees charged to 814 are for the opportunity to have products or services incorporated into supplemental content or directly placed into base content, which is then programmed into selected Viewspaces based on a variety of agreements and contracts. The nature of fees includes but is not limited to, fixed fee structures, fee for content programming time (amount of time the supplemental content is played or number of placements in a given time period), number of viewspaces the content is programmed into, customer and patron response to programming, length and quality of supplemental content, fraction revenues of the product or service advertised. Additionally, fees as described in the aforementioned transactional models may also apply.

Figure 9:
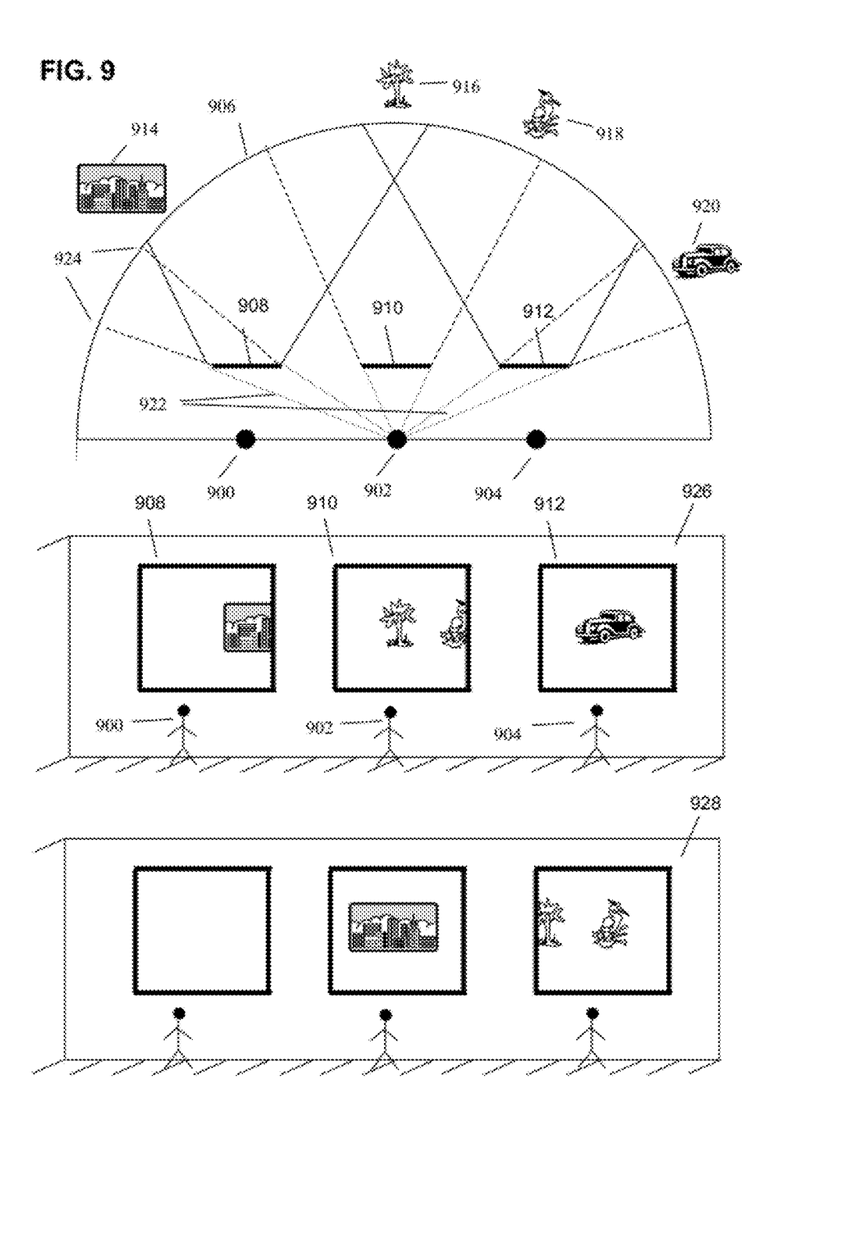
FIG. 9 of the drawings is an illustration of a Viewspace.

Referring now to FIG. 9, an immersive environment 906, is shown populated by a variety of objects 914, 916, 918, and 920 from an object space or real space. An immersive environment (IE) refers to an environment which is designed to simulate an object space in a manner in which an individual in a real space experiences the object space in a way that sensory awareness of the real space is diminished and awareness of the immersive environment is enhanced so that there is the illusion that the individual in no longer in the real space, but rather in the immersive environment. One example of an immersive environment includes a computer-generated space which can be seen through the use of appropriate display mediums. An immersive environment may be completely synthesized, having no imagery from the real world. For example, many recent computer generated movies do not include images captured from the real world but are, instead populated entirely by characters, settings, and objects that are generated using computer software. These worlds or environments are viewed in a theater, or on smaller viewing devices such as a television or portable movie player. The immersive environment 906 of FIG. 9 may include a representation of a real environment which has been captured using video or other image capture tools, and stored on a medium which allows for its projection or portrayal using appropriated displays. The data captured in this fashion may be subject to manipulation by computer software tools.

Display screens or displays 908, 910, and 912, which may be flat panel display or other types (projection, etc.) are shown positioned before hypothetical viewers 900, 902, and 904. The images shown on the displays are segments or portions of the immersive environment (IE) 906. In this case, the segments of the environment that are portrayed in each display, or window, are determined by the point of reference (spatial location) of the viewer 902 relative to the displays. The dotted lines 922, illustrate the segment of the IE which be seen by viewer 902 if the respective displays defined the field of view of the viewer 902. Thus, the displays are to be considered windows into the object space and each has an associated field of view defined by the angular distance between the lines 922. Dashed lines 924, for example, define the segment of the environment, which is defined by the area occupied by display 108. Thus, object 914 is partially seen in window 908, object 916 resides in the center of window 910, object 918 falls partially in the window 910, and object 920 lies in the center of window 912. This is approximately how viewer 902 would see these objects if the displays acted as windows on to the IE. Vignette 926 shows the windows as they would be seen by all the viewers with the viewset (set of views on displays 908 to 912) representing the point of reference of viewer 902. Vignette 928 shows the windows as they would be seen by all the viewers with the set of views or viewset representing the point of reference of viewer 904.

Figure 10:
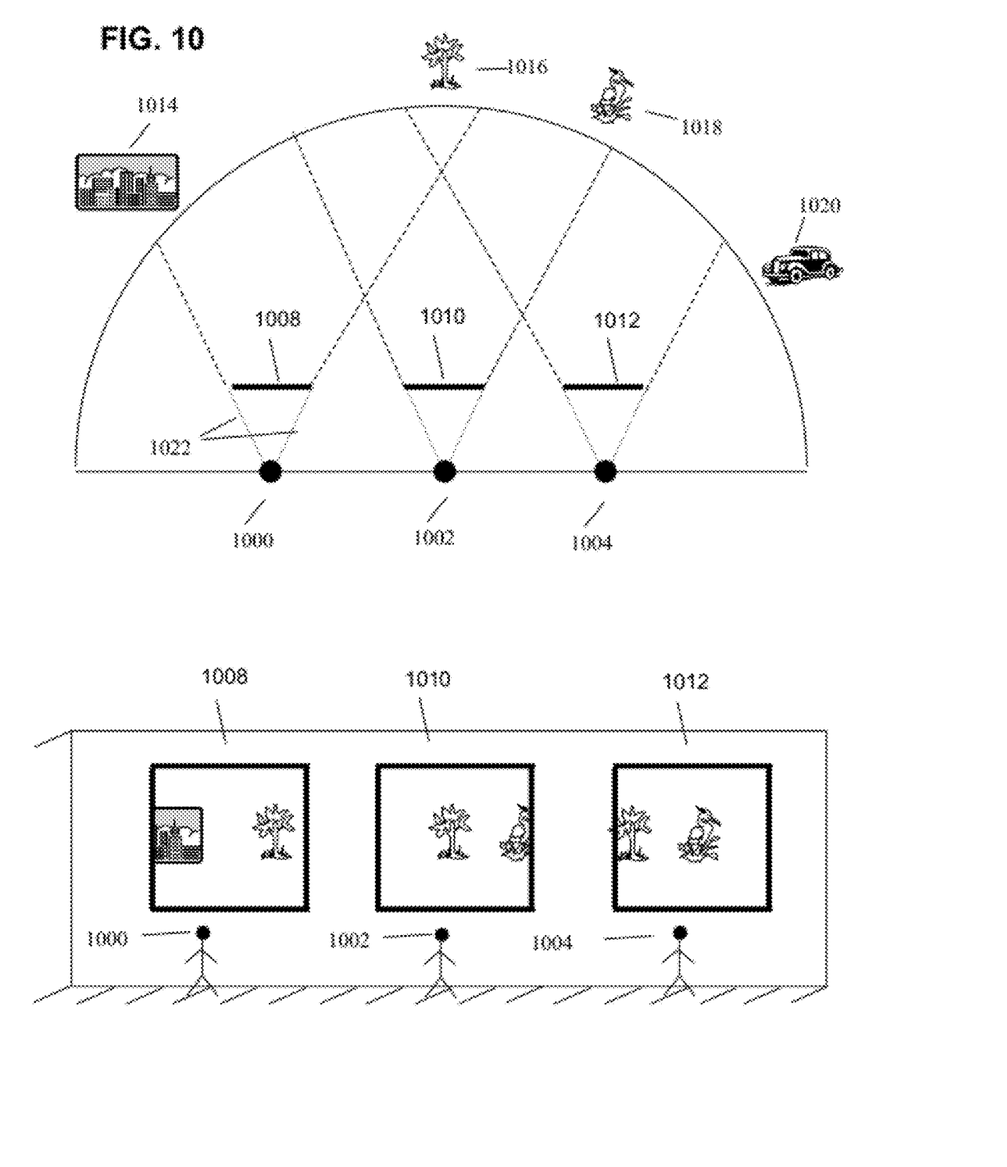
FIG. 10 of the drawings is an illustration of a system for Viewspace content generation, management, and distribution.

This representation of the IE, which shall be referred to as a viewset, is a compromise for a number of reasons, but in particular because it does not represent the perspectives of viewers 900 and 904. Referring now to FIG. 10, a different viewset is shown. In this case, the dotted lines 1022 are representative of the perspective and field of view that each of the viewer's 1000, 1002, and 1004 would see through the windows directly in front of the, windows 1008, 1010, and 1012 respectively. Thus, viewer 1000 would expect to see objects 1014 and 1016 at the edges of window 1008, while viewer 1002 would expect to see object 1016 at the center of window 1010. This viewset is also compromised due, in part, to the fact that each of the viewers is capable of seeing all of the windows simultaneously. The consequence is that objects which are repeated in adjacent windows, because the individual viewer's natural fields of view overlap, can be seen by all the viewers. Object 1016, for example, is present in all of the windows, while object 1018 is present in windows 1010 and 1012. This can be disconcerting and detracts from the effectiveness of the viewset at representing the SE.

Figure 11:
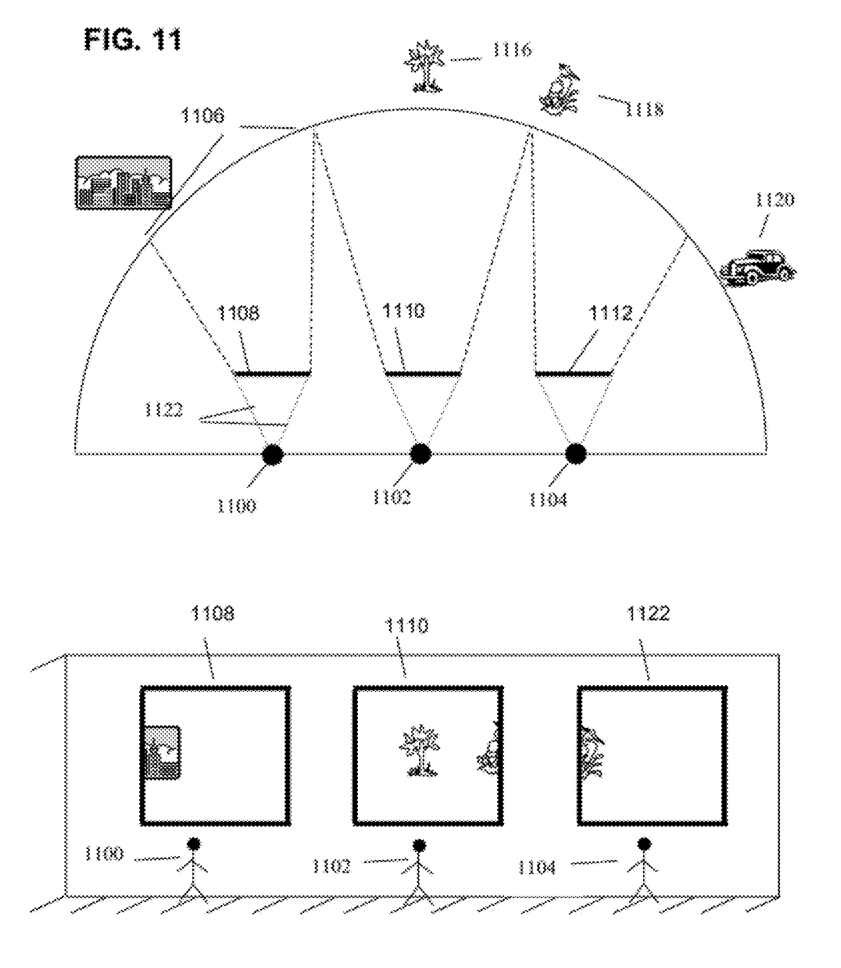
FIG. 11 of the drawings diagrams a business relationship between a Viewspace Provider and a Viewspace customer or patron.

In FIG. 11, a viewset is generated which attempts to compromise between the viewsets of FIGS. 9 and 10. In this case, the fields of view for each of the windows is redefined so that they do no overlap, thus object repetition is avoided. One consequence of this approach, however, is the generation of perspective discontinuity wherein the normal field of view is recast at the viewer's primary window. Viewer 1100, for example, has a normal field of view which is illustrated by dotted lines 1122 as defined by his primary window 1108. The generated field of view, which is represented by dashed lines 1106, is misaligned with the normal field. This may be further disconcerting given again the fact that all viewers can observer all windows. However, such a compromise is arguably superior than the image repetition of FIG. 10.

Figure 12:
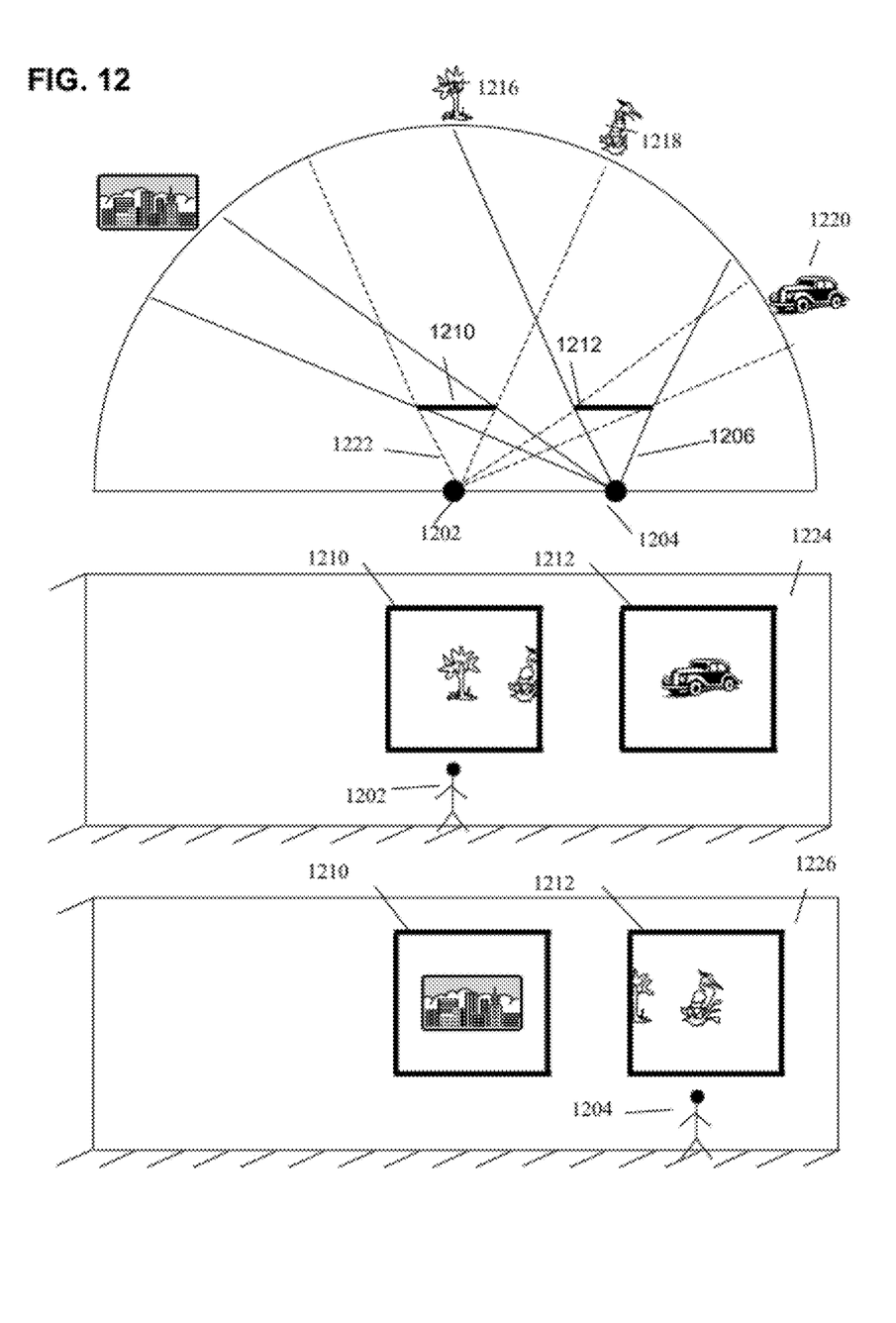
FIG. 12 of the drawings diagrams a business relationship between a Viewspace Provider and the owner or controlling entity of a Viewspace

Referring now to FIG. 12, yet another viewset is shown. In this case modifications to the performance of the displays have been made to enhance the effectiveness of the viewspace even further. The number of viewers, 1202 and 1204, has been reduced to two in order to simplify the illustration though in all cases the assumption is that multiple viewers in arbitrary positions may participate in the viewspace.

In this embodiment, displays 1210 and 1212 have been modified so that they are capable of simultaneously displaying more than one scene comprising images of an object space. The scenes represent different perspectives of the object space. Whether or not the perspective can be seen depends on the viewer's position with respect to the display, or in general the viewer's point of reference. Dotted lines 1222 represent the two sets of perspectives which can be seen by viewer 1202. Solid lines 1206 are used to represent the perspectives which can be seen by viewer 1204. The perspective of the IE that viewer 1202 can see on display 1212 is different than the perspective of the IE that viewer 1204 can see in display 1212. Vignette 2124 illustrates the perspectives shown on the displays as seen from the point of reference of viewer 1200. Vignette 1226 illustrates the perspectives visible to viewer 1204 in the displays. In general, for the embodiment shown in FIG. 12, it is possible that each screen displays multiple scenes, each representing a different perspective of the object space. In one embodiment, a real viewer's actual location relative to a display screen in the real space is mapped to the position of a hypothetical viewer relative to the window associated with the screen. This mapping determines which scene the real viewer actually sees. For example, from FIG. 12, it will be seen that viewer 1202 sees a tree object in the display 1210, whereas viewer 1204 sees a city skyline in the display 1210. If the viewer 1204 were to move to the left, then at some point the viewer 1204 would see the tree object on the display 1210. Likewise, if the viewer 1202 were to move to the right, then at some point the viewer 1201 would see the city skyline the display 1210.

In one embodiment, each scene that is shown on a display is correlated to a zone that is spatially located relative to the display. For example, in FIG. 12, the scene with the tree object in display 1210 may be correlated to a first zone which is adjacent the display 1210, whereas the scene with the city skyline may be correlated to a second zone which is laterally offset from the display 1210. Thus, if a real viewer is in the first zone, then the viewer would see the tree object in display 1210, as is the case for the hypothetical viewer 1202, and if the viewer is in the second zone then the viewer would see the city skyline in display 1210, as is the case for hypothetical viewer 1204. It will be appreciated that as a viewer moves between zones, the scene that the viewer sees on a particular display will change to correlate with the change in the zone.

The consequence is that perspective discontinuity can be reduced or eliminated. The overall result is a viewset which is a more realistic representation of the IE than the prior three embodiments. The viewspace is still compromised in that the viewer's perspective of the 1E does not change in a continous fashion as the viewer's point of reference changes. It does so in a staggered way shifting suddenly as the viewer shifts position. This can be further mitigated by increasing the number of views which can be portrayed in a given window. Ordinary displays can be easily modified to make them capable of portraying multiple views simultaneously.

What is claimed is:

1. A method for a viewspace provider, comprising:
providing a viewspace at a location, the viewspace comprising a plurality of displays, each to display a video stream, wherein each video stream comprises scenes of an object space as seen by a hypothetical viewer looking through a different window into the object space from a different position within the object space; and
engaging in a transaction with an entity for a monetary amount associated with the provision of the viewspace.

2. The method of claim 1, wherein the entity comprises a customer of the location.

3. The method of claim 2, wherein the monetary amount comprises a fee for allowing the customer to select content that the viewspace renders.

4. The method of claim 2, wherein the viewspace provider owns the location.

5. The method of claim 2, wherein the viewspace provider is one of an owner or licensee of the viewspace.

6. The method of claim 1, wherein the entity is selected from the group consisting of an owner of the viewspace, a licensee of the viewspace, and an owner of the location.

7. The method of claim 6, wherein the monetary amount comprises a predetermined percentage of profits generated by the entity.

8. The method of claim 6, wherein the monetary amount comprises a portion of an upfront fee charged to a customer of the location by the owner of the location.

9. The method of claim 6, wherein providing the viewspace comprises delivering content for the viewspace to the entity.

10. The method of claim 9, further comprising first providing a catalog of content for the viewspace, in which case delivering the content comprises delivering that content selected from the catalog to the entity.

11. The method of claim 1, wherein providing the viewspace comprises generating content for the viewspace.

12. The method of claim 11, wherein generating the content comprises generating custom content based on a request from an entity that owns or operates the viewspace.

13. The method of claim 12, wherein delivering the content comprises setting up a computer network for said delivering.

14. The method of claim 11, wherein generating the content comprises generating content that includes at least one advertisement.

15. The method of claim 14, wherein the at least one advertisement is interlaced with base content that does not include advertisements.

16. The method of claim 14, further comprising charging a monetary amount for the at least one advertisement.

17. The method of claim 1, wherein providing the viewspace comprises managing content for the viewspace.

* * * * *